United States Patent [19]

Wallich

[11] Patent Number: 4,653,929

[45] Date of Patent: Mar. 31, 1987

[54] APPARATUS FOR ADDING A FIRST GRANULAR MATERIAL TO A SECOND GRANULAR MATERIAL

[75] Inventor: Manfred Wallich, Nauheim, Fed. Rep. of Germany

[73] Assignee: Tetra Pak Developpement S.A., Pully, Switzerland

[21] Appl. No.: 737,193

[22] Filed: May 23, 1985

[30] Foreign Application Priority Data

May 25, 1984 [DE] Fed. Rep. of Germany ....... 3419518

[51] Int. Cl.[4] ........................ G05D 11/02; B01F 15/02

[52] U.S. Cl. .................................... 366/152; 222/233; 222/271; 366/195; 366/143

[58] Field of Search ............... 366/150, 152, 154, 155, 366/161, 162, 184, 194, 195, 196, 143; 222/271, 272, 233, 232

[56] References Cited

U.S. PATENT DOCUMENTS 2,063,606 12/1936 Johnson .............................. 222/232

3,933,086 1/1976 Standing ............................. 222/272

FOREIGN PATENT DOCUMENTS 2039266 8/1980 United Kingdom ................ 222/272

*Primary Examiner*—Robert W. Jenkins

*Attorney, Agent, or Firm*—Killworth, Gottman, Hagan & Schaeff

[57] ABSTRACT

An apparatus for adding a first granular material which is disposed in a first container to a second granular material is provided and includes a conveyor conduit connected to a conveyor means, and a feed conduit communicating with the conveyor conduit for the feed of the first granular material which is to be added.

In order to be able more easily to mix substances in powder or granular form, wherein the mixing ratio is to be continuously adjustable, the invention provides that disposed below the outlet opening of the first container containing the granular material to be added is a gap which is formed between two rollers. A communicating passage is provided between the gap and the feed conduit to provide the first granular material. By varying the width of the gap, the amount of the first granular material added may be quantitatively controlled.

8 Claims, 4 Drawing Figures

APPARATUS FOR ADDING A FIRST GRANULAR MATERIAL TO A SECOND GRANULAR MATERIAL

BACKGROUND OF THE INVENTION

The invention relates to a materials handling apparatus, amd more particularly to an apparatus for adding a first granular material disposed in a first container to a second granular material disposed in a second container, having a conveyor conduit connected to a conveyor means, and a feed conduit which communicates with the conveyor conduit, for the feed of the first granular material to be added.

The term granular material is used in accordance with this invention to denote a material in grain form, the grain size of which may vary within wide limits, that is to say, powder components may be processed with the mixing apparatus according to the invention, as well as course-grain components.

Dyeing or coloring apparatuses are known for mixing granular or powder dyestuffs, additives and the like. Such apparatuses are used as components in an injection molding machine system.

In one specific embodiment of the known dyeing or coloring apparatus, a disc which is provided with outer chambers, acting as a metering cell, rotates in a horizontal plane beneath the material which is to be metered, and , at a given point, allows the material which is received by the chambers to drop into a mixer. The individual components are fed to the mixer in the ratio therebetween which is preselected at a control arrangement, and are so intensively mixed by a mixing tool that the mixture leaves the outlet of the mixer in a homogenous condition.

The major disadvantage of those known coloring or mixing apparatuses is that a first material, admixed with a second material, from two separate containers, must be introduced in a metered condition into a third additional container where the material must undergo mixing for a certain period of time before then the final product, in the desired ratio between the components in the mixture, can leave the third mixing container. It will be seen that known mixing apparatuses require more space and operating time for, besides the basic granulates or basic materials, the mixed materials must also be received in an additional container and mixed therein. The respective stirring tools are provided with additional drives and the overall control means for setting the correct ratio between the components of the mixture is complicated. All in all, the known apparatus is to be considered as being very expensive, and it is not possible for the ratio between the components of the mixture to be continuously varied.

The object of the present invention is therefore so to improve such known mixing apparatuses that substances in powder or grain form, which herein are generally referred to as granular material, can be mixed in a simpler fashion, while the ratio between the components of the mixture is also to be continuously adjustable.

SUMMARY OF THE INVENTION

According to the invention, that object is attained in that disposed below the outlet opening of the first container containing the granular material to be added is a gap which is formed by two rollers, a communicating passage is provided between the gap and the feed conduit, with at least one of the two rollers being driven by a motor. The width of the gap is adjustable and surprisingly permits the product or granular material which is to be added to pass therethrough at a greater or lesser speed, while the speed of through flow of the main granular material is adjustable independently thereof. In other words, in this way it is possible to provide a quantitative control in respect of the first granular material which is to be added, and such quantitative control is additionally also advantageously adjustable.

If the mixing apparatus according to the invention is used as a dyeing or coloring apparatus, it will be seen that the dyeing or coloring action can then be continuously adjusted. Advantageously, the operation of mixing the components of the first granular material with the second granular material is effected by the continuous feed of the first granular material to be added, to the second granular material which is in a condition of movement. Accordingly, a special mixing means with the corresponding control means, stirrer mechanism and the like are eliminated. Those expensive ancillary devices are essential in the known arrangements, but nonetheless, in that respect, it is not possible to avoid the necessity that all the components must be fully mixed before they can be emptied out and fed to the next processing operation. It is only after the mixing container has been completely emptied, in the known mixing apparatuses, that it is possible to set the next and possibly different ratio as between the components of the mixture. In this connection the invention provides considerably simpler apparatuses and affords a simpler mode of operation with nonetheless a higher degree of operational versatility.

A further development of the present invention advantageously provides that the gap between the two rollers is of a width which is smaller than or equal to the grain size of the first granular material which is to be added. The grains, of greater or smaller size, may then only be brought into a condition of movement by the peripheral speed of the rollers, on an individual basis and in a single layer, that is to say, not with a plurality of grains one beside the other. That means that the number of grains of granular material per unit of time is automatically variable.

In that connection, in accordance with the invention, it is particularly desirable if at least one of the two rollers has a coating or layer of an elastic material on its peripheral surface, with preferably both rollers being driven in synchronous relationship with each other. In that way it is possible for the speed of the grains of material passing therethrough to be exactly controlled, while the elastic coating or layer on the rollers means that the grains are treated carefully, ensuring that the grains do not suffer from surface erosion or even crushing.

If moreover in accordance with the invention the drive motor for the rollers is a direct current motor, the control in respect of the peripheral speed of the rollers can be regulated in a particularly fine and reliable fashion so that the ratio of components in the mixture can be continuously adjusted in a very fine manner.

Occasionally, a bridge formation phenomenon, which is a disadvantage, occurs at the outlet end of a container which converges downwardly in a generally funnel-like configuration, particularly when the container contains materials in fine-grain or even powder form, so that difficulties are involved in emptying such a container. The invention provides a remedy in that a shaker means is provided above the outlet opening and/or in the lower region of the first container. Preferably, a shaker movement is produced with the same drive means as for the rollers, with the shaker movement being transmitted for example to a shaker member in the form of a hook, wire or lever. That eliminates any bridge formation in the course of operation so that the flow of the respective granular material is reliably ensured.

It is also advantageous in accordance with the invention if the feed conduit has a preferably adjustable suction throttle. The feed conduit opens into the main conveyor conduit in which, for example, the main granular material or second granular material is conveyed from a main container to the processing or treatment station. Due to the movement of the gas/granular material mixture, a reduced pressure is generated at the opening of the feed conduit into the conveyor conduit so that due to that reduced pressure and due to the reduced pressure in the conveyor conduit, a reduced pressure also occurs in the feed conduit. That automatically provides for conveying the particles or grains of granular material which are conveyed from the rollers in given quantities per unit of time. If a suction throttle is arranged at the feed conduit in the above-described manner, then the feed speed of the grains of granular material which are conveyed away from the rollers from the feed conduit into the main conduit can be varied. That advantageously eliminates blocking of the feed conduit.

A further embodiment of the invention is advantageously characterized in that the feed conduit, in the region of the mouth opening of the communicating passage, has a viewing opening so that the flow of first granular material which is to be added can be observed.

The feed flow of the first granular material which, in the case of a coloring or dyeing apparatus for example may represent the coloring or dyeing granular material can therefore be regulated by the speed of rotation of the rollers and the roll gap which is formed by the two rollers. The apparatus according to the invention advantageously provides that the grains of granular material conveyed from the container by way of the gap between the rollers, for example the coloring or dyeing granular material, are conveyed in only a single row of grains. By virture of that aspect, it is not possible for example for two rows of grains of granular material to be disposed one upon the other in the gap between the rolls, so that such rows cannot pass in superposed relationship through the gap between the two rollers. That once again makes is possible to provide for precise metering of the granular material which is to be added, by means of adjustment to the speed of rotation of the direct current motor.

These, and other advantages of the present invention will become apparent from the following description, the accompanying drawings, and the appended claims.

DESCRIPTION OF THE PREFERRED EMBODIMENTS

Figure 1:
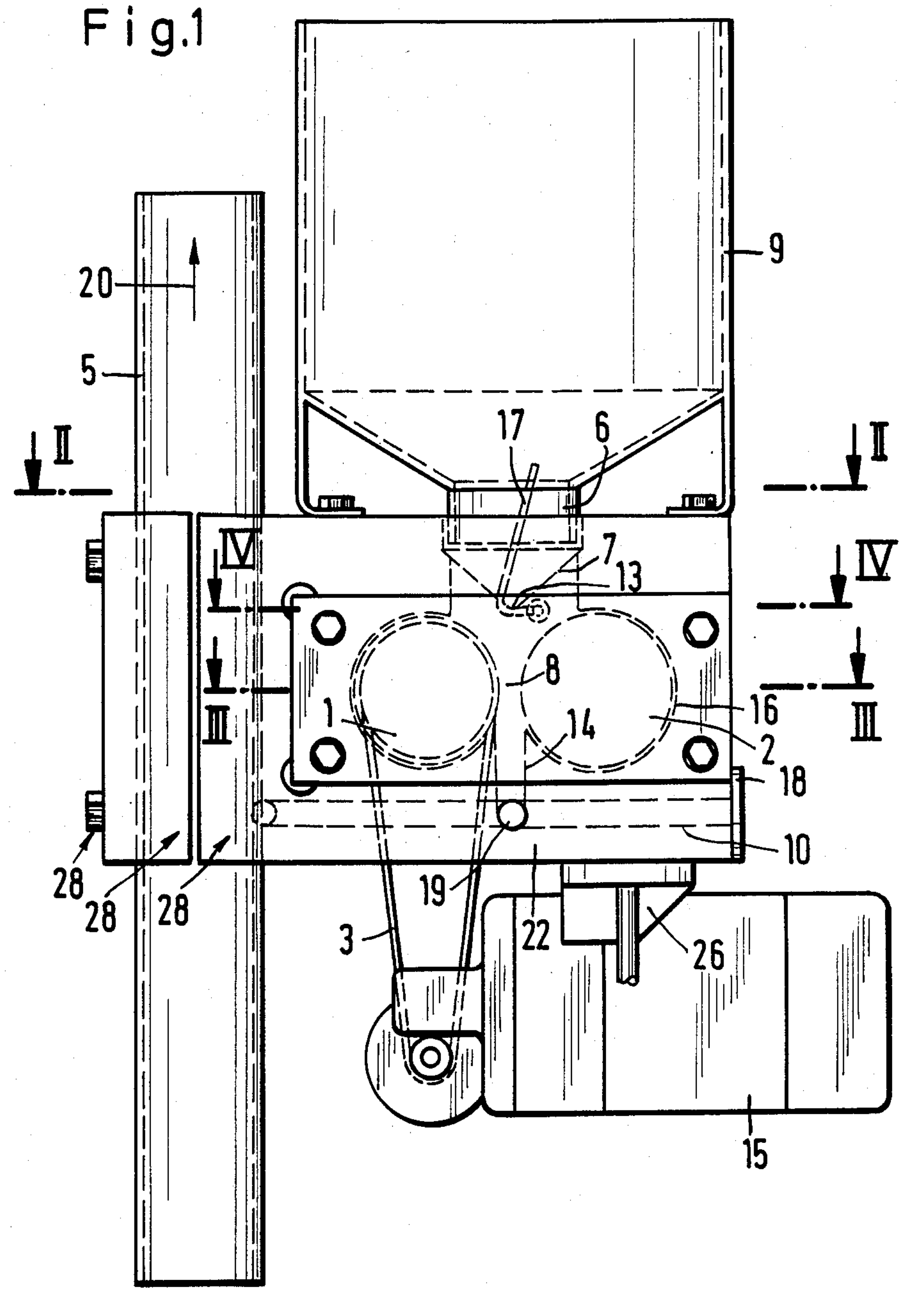
FIG. 1 is a diagrammatic and partly broken-away view of the first container with the first granular material to be added, for example the coloring granular material, with rollers disposed therebelow and the drive motor for the rollers.

The embodiment illustrated in FIGS. 1 through 4 is a coloring or dyeing apparatus wherein an additive or coloring or dyeing granular material with a grain size of for example 2 mm is contained in a first container 9 from which the material is conveyed to the conveyor conduit 5 by way of the rollers 1 and 2 with the roll gap 8 therebetween. In the conveyor conduit 5, the main granular material which is to be dyed or colored is conveyed by a suction effect in the direction indicated by the arrow 20. The container for the main granular material, for example a transparent granular material for producing plastic caps, is not shown in FIG. 1, but is connected to the conveyor conduit which is in the form of a granular material conveyor conduit 5. The processing or treatment station with the extruder is likewise not illustrated.

Figure 2:
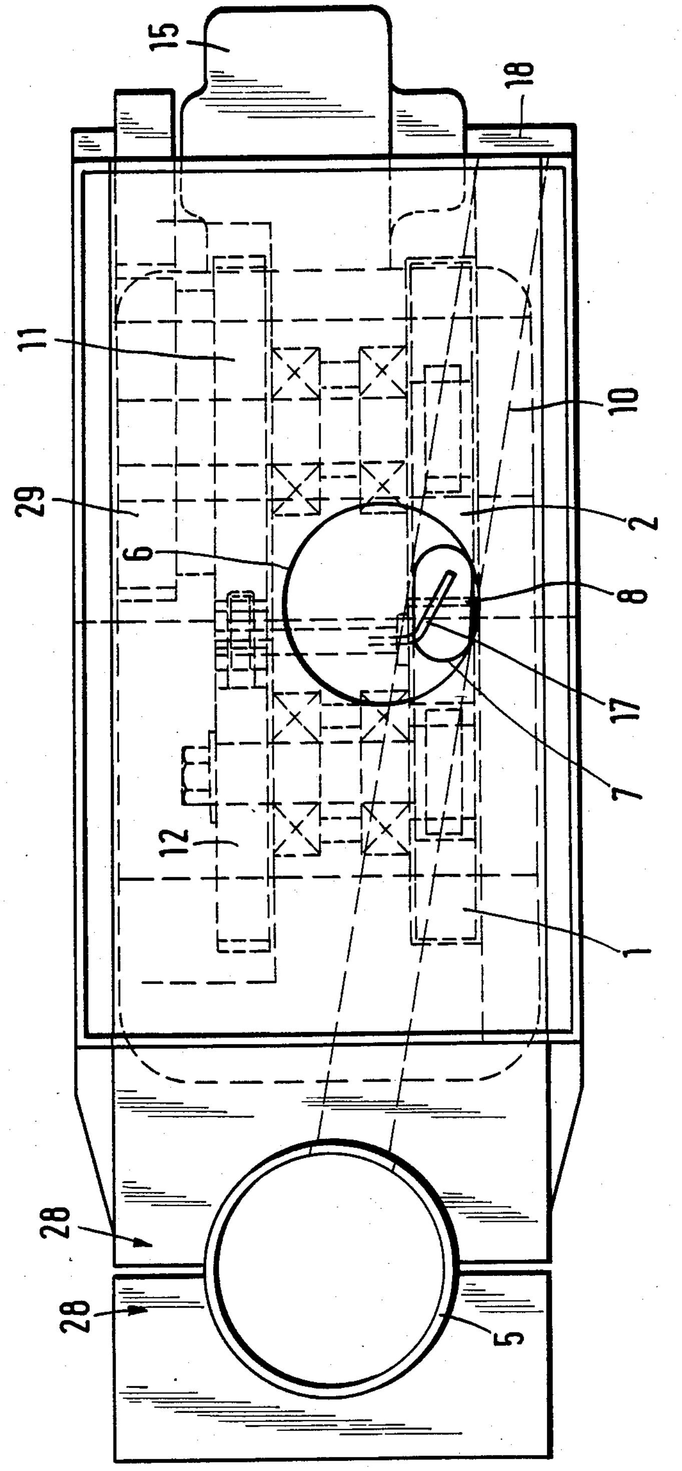
FIG. 2 shows a view in section taken along line II—II in FIG. 1.
Figure 4:
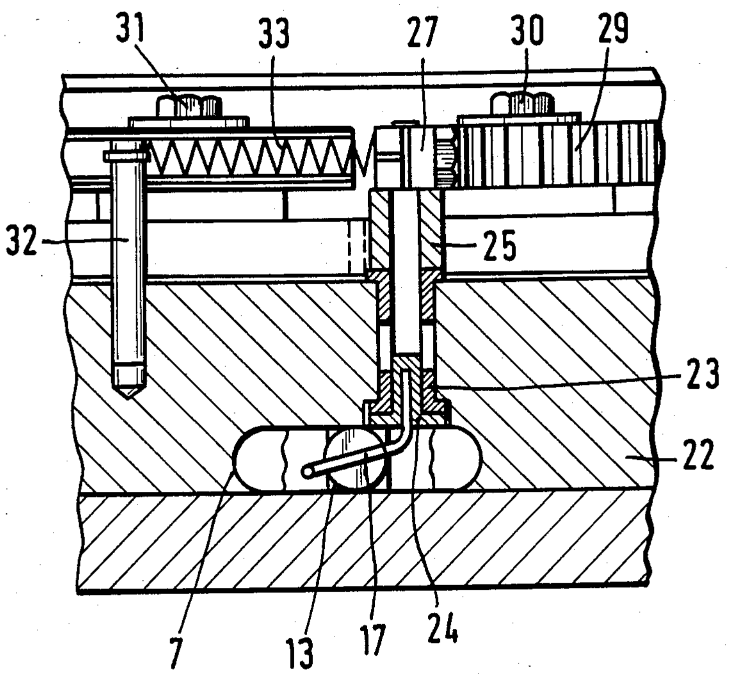
FIG. 4 shows a broken-away view in section taken approximately along line IV—IV in FIG. 1.

The material referred to as the first granular material may fall out of the first container 9, with the formation of bridges thereby being avoided by means of the shaker means 17, into the opening 6 which serves as the outlet of the container 9, and from there into the hopper or funnel portion 7 which tapers downwardly in the views shown in FIGS. 1, 2 and 4, partially with a flattening configuration and eccentrically with respect to the opening 6. From the outlet opening 13 which functions as a metering opening, the grains of granular material drop into the roll gap 8 between the two rollers 1 and 2 which, in the embodiment illustrated herein, are coated with a coating or layer 16 of elastic material (being for example of silicone rubber). It would also be possible for the roller 1 to be rubberized, whereas the roller 2 is a solid roller, but in the preferred embodiment both rollers 1 and 2 are preferably rubberized in the above-described manner. Disposed between the gap 8 and the feed conduit 10 in the form of a bore in the housing 22 is a communicating passage 14 in the form of a metering shaft. The passage 14 opens in the feed conduit 10 which in turn terminates in the conveyor conduit 5. Disposed on the end of the feed conduit 10 which is in opposite relationship to the mouth opening at which the feed conduit 10 opens into the conveyor conduit 5 is a suction throttle 18 in the form of a suction air aperture or shutter means. In other words, an opening (shown at bottom right in FIG. 1, above the drive motor 15), is adjustably closed to a greater or lesser degree by a slider, thus giving the suction throttle effect.

Figure 3:
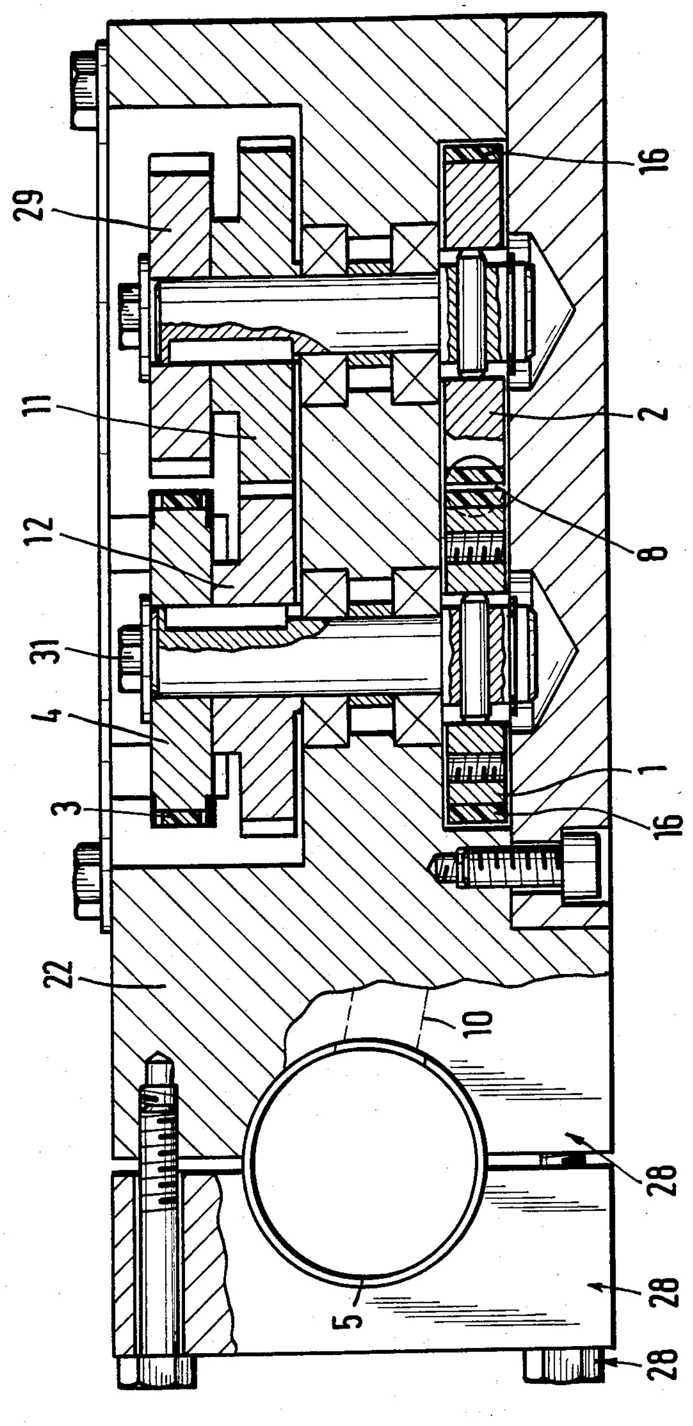
FIG. 3 shows a partly-broken away view in section taken approximately along line III—III in FIG. 1.

The rollers 1 and 2 are driven by way of the drive motor 15 and the chain or the toothed belt 3, as can be seen in side view ih FIG. 1 and in plan view in FIGS. 2 and 3.

Finally, FIG. 1 shows the fixing of the entire apparatus to the conveyor conduit 5 by means of the clamping fixing assembly which is generally denoted by 28, the mounting 26 for the motor 15 and the viewing opening 19 in the form of a continuous bore in the lower region of communicating passage 14 which intersects the feed conduit 10.

FIG. 3 clearly shows the drive relationships. The drive motor 15 which is operated by direct current, by way of the toothed belt 3, drives the drive gear 4 which drives the connecting gear 12 and the rubberized roller 1 by way of the keyed shaft. The roller 1 is secured by way of the entrainment pin which extends transversely in the lower part of FIG. 3. FIG. 3 clearly shows the gap 8 which is 1 mm in width in the embodiment described herein. In other words, the narrowest distance between the two rollers 1 and 2 is 1 mm.

The gear 12 drives a further connecting gear 11 which, by way of the illustrated shaft with groove-key connection, drives the second roller 2 and a gear 29 which is also shown in FIG. 4 and which shows the drive for the shaker 17. The bearings and the spacer sleeves of the shafts for the connecting gears 11 and 12 as well as the rollers 1 and 2 are not described in greater detail herein.

FIG. 4 shows the shaker 17 which is in the form of a L-shaped pin and which is fixed by soldering in the shaft 24. The shaft 24 is carried in the bearing bush 23 in the housing or main body 22. In addition, FIG. 4 also shows the connecting shaft 25. It will be appreciated that the shaker 17 is disposed in the hopper-shaped outlet 7 in the region above the metering opening 13. An oscillatory movement is imparted thereto by a clamping member 27 sliding over the teeth of the gea 29 due to the tensile force of a spring 33, as shown in FIG. 4. References 30 and 31 denote the screw means for fixing the corresponding gears, in this case the drive gear 4 and the connecting gear 11 respectively, to the drive shaft. The mounting pin 32 for the tension spring 33 is also illustrated for the sake of enhanced comprehension of the structure of the entire shaker arrangement. The end of the tension spring 33 which is shown at the left in FIG. 4 is therefore secured to the pin 32 while the oppositely disposed end, as shown in FIG. 4, is mounted to the clamping member 27 therebeneath so that, upon pivotal movement of the clamping member, the side thereof which is at the right in FIG. 4 slides over the teeth of the gear 29 and produces the oscillatory or shaker movement for the shaker 17.

In operation, the grains of the first granular material in the first container 9 fall through the outlet opening 13 into the gap 8 between the rollers. A series of grains of granular material is conveyed at greater or lesser speed, according to the peripheral speed of the rollers 1 and 2, through the communicating passage 14 into the feed conduit 10 and from there, depending on the setting of the suction throttle, are conveyed into the main conveyor conduit 5 in which a transparent granular material for the production of container caps is sucked in the direction indicated by the arrow 20 from the main container (not shown) to a processing station.

While the apparatus herein described constitutes a preferred embodiment of the invention, it is to be understood that the invention is not limited to this precise apparatus, and that changes may be made without departing from the scope of the invention, which is defined in the appended claims.

What is claimed is:

1. Apparatus for adding a first granular material to a second granular material comprising a first container containing said first granular material, said first container having an outlet opening, a pair of rollers disposed below said outlet opening with at least one of said rollers being driven by a motor, said rollers having a gap therebetween forming a passage communicating with a feed conduit for feeding said first granular material, said feed conduit communicating further with a second conduit containing said second granular material, and said feed conduit further including means for varying the speed at which said first granular material is fed into said second conduit.

2. The apparatus of claim 1 in which said gap between said rollers is of a width which is less than or equal to the grain size of said first granular material.

3. The apparatus of claim 1 in which at least one of said rollers has an elastic material coated on the peripheral surface thereof.

4. The apparatus of claim 1 in which said rollers are driven in synchronous relationship with each other.

5. The apparatus of claim 1 in which said motor is a direct current motor.

6. The apparatus of claim 1 in which a means for shaking said first granular material is provided in said first container above said outlet opening.

7. The apparatus of claim 1 in which said speed varying means is an adjustable suction throttle.

8. The apparatus of claim 1 in which said feed conduit has a viewing opening in the lower region of said communicating passage.

* * * * *